W. J. STOLTZ.
VEHICLE TIRE.
APPLICATION FILED DEC. 7, 1917.

1,338,595.

Patented Apr. 27, 1920.

Inventor
William J. Stoltz,

By
*[signature]*
Attorney

UNITED STATES PATENT OFFICE.

WILLIAM J. STOLTZ, OF ST. LOUIS, MISSOURI.

VEHICLE-TIRE.

1,338,595. Specification of Letters Patent. Patented Apr. 27, 1920.

Application filed December 7, 1917. Serial No. 206,038.

*To all whom it may concern:*

Be it known that I, WILLIAM J. STOLTZ, a citizen of the United States, residing at St. Louis, in the county of St. Louis City and State of Missouri, have invented new and useful Improvements in Vehicle-Tires, of which the following is a specification.

The invention has for its principal object to provide a vehicle tire of a pneumatic type which will partake of all of the advantages of the latter and yet be free from the danger of falling flat in the event of puncture.

A further purpose of the invention is to provide a tire of this kind which is of comparatively simple construction, yet durable and effective in operation, and inexpensive to manufacture.

Other and further purposes will be made apparent as the invention is set forth in detail in the description which follows. To the exact construction in which it is shown and described, the invention is not to be restricted. Its actual practical application may suggest certain desirable changes or alterations and the right is claimed to make any which do not deviate from the spirit of the subjoined claim.

Figure 1:
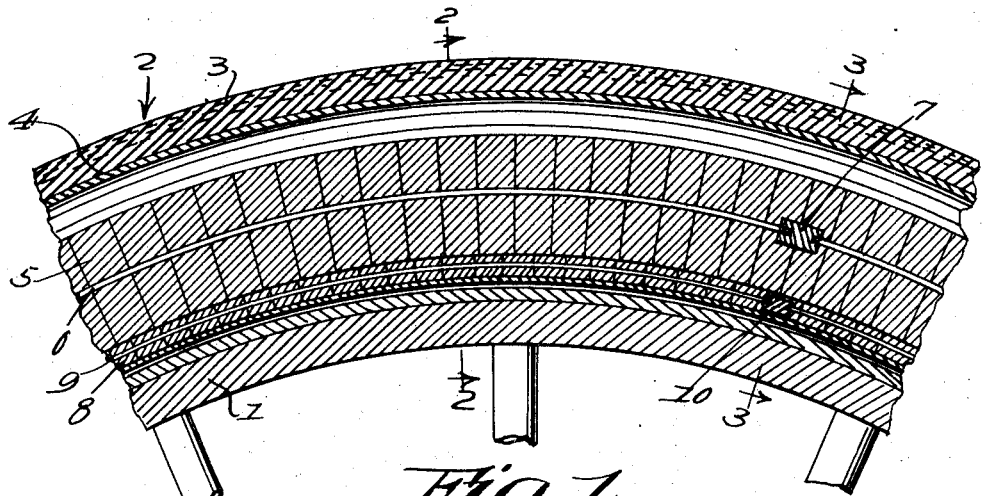
Figure 1 is a longitudinal sectional view through a tire constructed in accordance with the invention.
Figure 2:
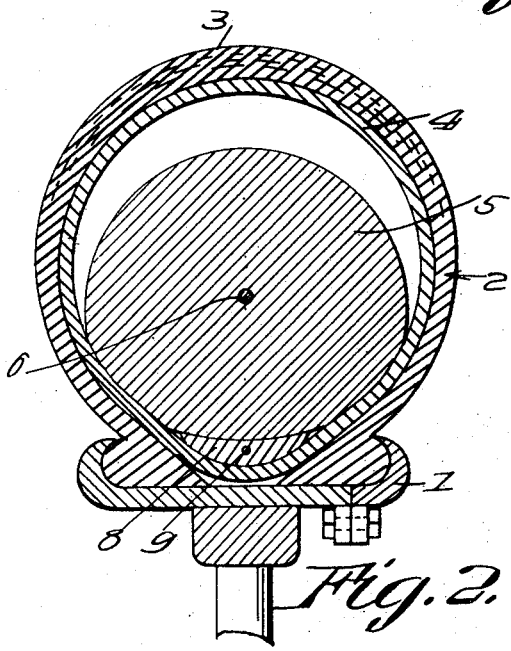
Fig. 2 is a section on line 2—2 of Fig. 1.
Figure 3:
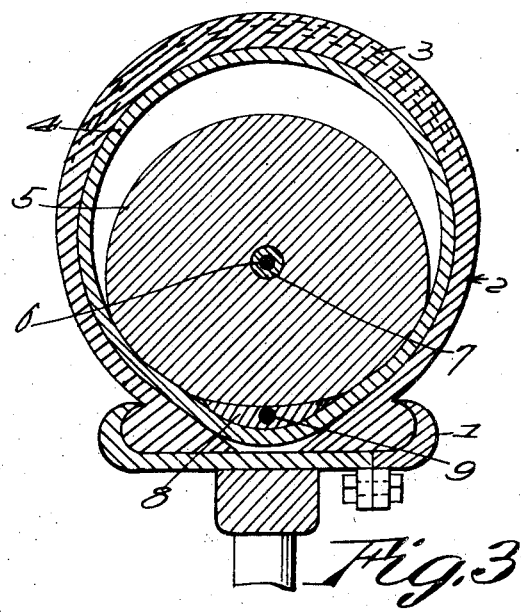
Fig. 3 is a section on line 3—3 of Fig. 1.

Referring to the drawings, there is shown the conventional rim 1 of the wheel of an auto vehicle. The outer tube 2 is attached to the rim 1 in the usual way and is made of the usual heavy reinforced rubber provided with a tread 3.

The usual form of inner tube 4 is carried within the outer tube 2 in the usual way.

The supplementary tire is carried within the inner tube 4 and is made up of a series of cork or pith circular disks 5 which are carried on a steel wire 6 which passes through their centers, the two ends of the steel wire being joined by a coupling 7 circular in cross section and provided with apertures at either end which the ends of the wire 6 enter and are attached thereto by soldering or other convenient means. The cork or pith disks 5 which stand in the vicinity of the coupling 7 are provided with larger center holes than those disks which are strung on the remainder of the wire. Thus, a cork ring is provided interior to the inner tube 4, the ring being made of such a diameter that the cork disks rest against the sides of the inner tube at points adjacent the rim 1 of the wheel.

A cork filler ring 8 conforming in shape to that portion of the inner tube which extends down between the clencher flanges of the outer tube is positioned in this part of the inner tube and contacts with the interior edge of the cork ring made up of the disks 5. This filler ring is also made up of sections of cork or pith assembled on a suitable strand of wire 9.

The filler ring 8 and the ring made up of the disks 5 are arranged to be of the proper circumference to suit the inner tube to which they are attached and both are inserted through the tube before their respective wires 8 and 6 have their ends connected together. After these two rings have been inserted through the tube and assembled in the form of rings, the tube itself is completed by vulcanizing together the two ends which were previously stretched or folded back to permit the attachment of the ends of the two rings referred to. The yieldable quality of the cork or pith employed permits the latter to be compressed sufficiently to allow the ends of the wires 6 and 8 to be attached together and when the compressive force has been removed from the cork, it will expand sufficiently to fill the space made necessary for the operation of connecting the ends of the wires together.

The inner tube is filled with air by a conventional form of air valve, as in the case of other pneumatic tires, the air passing readily between the cork rings and the adjacent sides of the inner tube, the latter stretching sufficiently to permit this passage of air.

It will be observed that the tire possesses all the advantages of the pneumatic tire but in case of puncture it is precluded from collapsing by the cork ring made up of the disks 5 which collapsing would otherwise allow the tire to be cut by the rim of the wheel.

Figure 4:
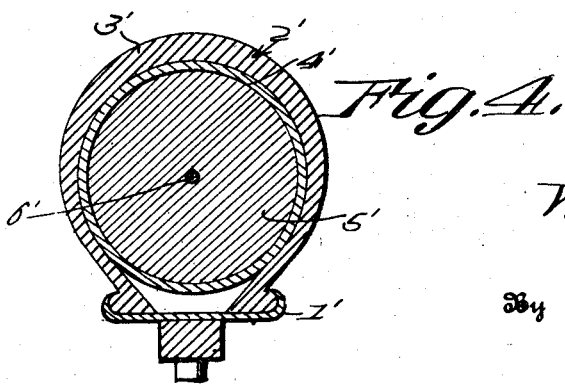
Fig. 4 is a cross sectional view of a modified form of the invention.

In Fig. 4 there is shown a modified form of the invention. In this form the outer tube 2', the inner tube 4' and all their associated parts, with the exception of the cork disks 5', are substantially identical with the equivalent parts shown in the preferred form. In this modified form, however, the cork disks 5' completely fill the interior of the inner tube 4' and the cork filler ring is omitted.

Having thus fully described the invention, what is claimed as new and desired to be secured by Letters-Patent is:—

The combination with a pneumatic tire and a clencher rim therefor, the tire comprising an outer casing carried by the rim and an inner tube carried within the casing, of a supplementary tire made up of a series of cork or pith disks and a wire passing through the disks and securing them together, the said supplementary tire being carried within the inner tube, and a cork filler ring also consisting of a plurality of sections and a wire grouping these sections together, the said filler ring being carried in the inner tube in that portion of the latter which extends down between the clencher beads of the outer tube, and having the supplementary tire bearing upon it, the supplementary tire being in cross-sectional area materially smaller than the inner tube so that an air space exists between the supplementary tire and the tube adjacent the side walls and that wall of the latter adjoining the tread of the outer casing.

In testimony whereof I affix my signature.

WILLIAM J. STOLTZ.